US011719358B2

United States Patent
Kovacs et al.

(10) Patent No.: US 11,719,358 B2
(45) Date of Patent: Aug. 8, 2023

(54) SWITCH FOR DIAPHRAGM VALVE ACTUATOR

(71) Applicant: ITT MANUFACTURING ENTERPRISES LLC, Wilmington, DE (US)

(72) Inventors: Richard Kovacs, Lancaster, PA (US); Louis Matalon, Lancaster, PA (US)

(73) Assignee: ITT MANUFACTURING ENTERPRISES LLC

( * ) Notice: Subject to any disclaimer, the term of this patent is extended or adjusted under 35 U.S.C. 154(b) by 73 days.

(21) Appl. No.: 16/230,347

(22) Filed: Dec. 21, 2018

(65) Prior Publication Data

US 2019/0203851 A1 Jul. 4, 2019

Related U.S. Application Data (60) Provisional application No. 62/612,370, filed on Dec. 30, 2017.

(51) Int. Cl.
*F16K 37/00* (2006.01)
*F16K 31/126* (2006.01)
(Continued)

(52) U.S. Cl.
CPC ............ *F16K 37/0033* (2013.01); *F16K 7/12* (2013.01); *F16K 31/1221* (2013.01);
(Continued)

(58) Field of Classification Search
CPC ............. F16K 37/0041; F16K 37/0033; F16K 31/1221; Y10T 137/8242
See application file for complete search history.

(56) References Cited

U.S. PATENT DOCUMENTS 5,316,263 A 5/1994 Mino
6,321,776 B1 * 11/2001 Pratt ...................... F16K 31/04
251/331

(Continued)

FOREIGN PATENT DOCUMENTS

CN 1371494 A 9/2002
CN 101163891 A 4/2008
(Continued)

OTHER PUBLICATIONS

Chinese Office Action dated Jan. 12, 2022, for Corresponding Chinese Application No. 201880087837.0 (26 pages).
(Continued)

*Primary Examiner* — Atif H Chaudry
(74) *Attorney, Agent, or Firm* — Carter, DeLuca & Farrell LLP; George Likourezos; Bret Shapiro (57) ABSTRACT

Technologies are described for devices and methods to determine a position of a valve. The devices may comprise a housing attached to an actuator. The actuator may be in physical communication with the valve. The devices may comprise a microcontroller within the housing. The microcontroller may be in communication with the actuator to control a position of the valve. The devices may comprise a position sensor module in communication with the microcontroller. The devices may comprise a position sensor target attached to at least one part of the actuator that moves. The position sensor module may be configured to detect movement and a position of the position sensor target, generate position data related to the position of the position sensor target, and transmit the position data to the microcontroller. The microcontroller may be configured to determine a position of the valve based on the position data.

10 Claims, 9 Drawing Sheets

(51) Int. Cl.
*F16K 31/122* (2006.01)
*F16K 7/12* (2006.01)

(52) U.S. Cl.
CPC ...... *F16K 31/1262* (2013.01); *F16K 37/0041* (2013.01); *Y10T 137/8242* (2015.04)

(56) References Cited

U.S. PATENT DOCUMENTS

| | | | |
|---|---|---|---|
| 2002/0007854 A1* | 1/2002 | Dilger | G01F 1/363 137/554 |
| 2005/0127200 A1 | 6/2005 | Cox | |
| 2006/0144438 A1* | 7/2006 | Dresselhaus | G01N 27/223 137/78.3 |
| 2008/0060509 A1 | 3/2008 | Beuth | |
| 2009/0140730 A1* | 6/2009 | Newman | G01D 5/145 324/207.24 |
| 2013/0066587 A1* | 3/2013 | Kalathil | G01R 33/098 324/207.21 |
| 2013/0092863 A1* | 4/2013 | Christmann | F16K 37/0041 251/333 |
| 2013/0319551 A1* | 12/2013 | Dohi | F16K 31/1221 137/551 |
| 2014/0263863 A1* | 9/2014 | Muller | A63H 19/32 246/415 A |
| 2015/0033941 A1 | 2/2015 | Kouketsu | |
| 2017/0307093 A1 | 10/2017 | Yo | |
| 2018/0106393 A1* | 4/2018 | Laessler | F15B 15/202 |

FOREIGN PATENT DOCUMENTS

| | | | |
|---|---|---|---|
| CN | 101952689 A | 1/2011 | |
| CN | 102840385 A | 12/2012 | |
| CN | 103403419 A | 11/2013 | |
| CN | 103777651 A | 5/2014 | |
| CN | 106795980 A | 5/2017 | |
| DE | 4438293 A1 * | 5/1996 | F15B 15/10 |
| DE | 202010016534 U1 | 3/2012 | |
| DE | 102012003230 B3 | 3/2013 | |
| EP | 1852588 A2 | 11/2007 | |
| WO | WO-2016177874 A1 * | 11/2016 | F15B 15/202 |

OTHER PUBLICATIONS

European Examination Report dated Mar. 29, 2022, for Corresponding European Patent Application No. 18836781.7.
Chinese Office Action dated Jun. 28, 2022 in corresponding Chinese Patent Application No. 201880087837.0 (8 pages).
Decision of Rejection in corresponding Chinese Patent Appliction No. 201880087837, dated Oct. 21, 2022 (11 pages).
European Examination Report dated Nov. 24, 2022, for Corresponding European Patent Application No. 18836781.7.

* cited by examiner

SWITCH FOR DIAPHRAGM VALVE ACTUATOR

CROSS REFERENCE TO RELATED APPLICATION

This application claims priority under 35 U.S.C. § 119(e) to provisional application U.S. 62/612,370 filed on Dec. 30, 2017, the entirety of which is hereby incorporated by reference

BACKGROUND

Unless otherwise indicated herein, the materials described in this section are not prior art to the claims in this application and are not admitted to be prior art by inclusion in this section.

Diaphragm valves may be used in biotechnology and pharmaceutical industries. A diaphragm valve may control a flow of a fluid through a body of the diaphragm valve. An actuator may be a mechanical device with a power source which may control movement of the diaphragm of the diaphragm valve. The actuator may control the diaphragm of a diaphragm valve to open and close a fluid flow path through the body of the diaphragm valve or may allow an intermediate position of the diaphragm. The actuator may be electric, pneumatic, or hydraulic powered.

SUMMARY

One embodiment of the invention is a switch device to determine a position of a valve. The devices may comprise a housing attached to an actuator. The actuator may be in physical communication with the valve. The devices may comprise a microcontroller within the housing. The microcontroller may be in communication with the actuator to control a position of the valve. The devices may comprise a position sensor module. The position sensor module may be in communication with the microcontroller. The devices may comprise a position sensor target attached to at least one part of the actuator that moves. The position sensor module may be configured to detect movement and a position of the position sensor target, generate position data related to the position of the position sensor target, and transmit the position data to the microcontroller. The microcontroller may be configured to determine a position of the valve based on the position data.

Another embodiment of the invention includes a system to determine a position of a valve. The systems may comprise an actuator. The actuator may be in physical communication with the valve. The actuator may be configured to move in a first direction to close the valve and to move in a second direction to open the valve. The systems may comprise a switch device. The switch device may include a housing attached to the actuator. The switch device may include a microcontroller within the housing. The microcontroller may be in communication with the actuator to control a position of the valve. The switch device may include a position sensor module. The position sensor module may be in communication with the microcontroller. The switch device may include a position sensor target attached to at least one part of the actuator that moves. The position sensor module may be configured to detected movement and a position of the position sensor target, generate position data related to the position of the position sensor target, and transmit the position data to the microcontroller. The microcontroller may be configured to determine a position of the valve based on the position data.

Another embodiment of the invention is a method to control a position of a valve. The methods may comprise detecting a position of a position sensor target by a position sensor module. The position sensor target and the position sensor module may both be located within the valve. The methods may comprise generating position data by the position sensor module. The methods may comprise transmitting, by the position sensor module, the position data to a microcontroller of a switch device. The methods may comprise receiving, by the microcontroller, the position data. The methods may comprise determining, by the microcontroller, a position of the valve based on the position data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
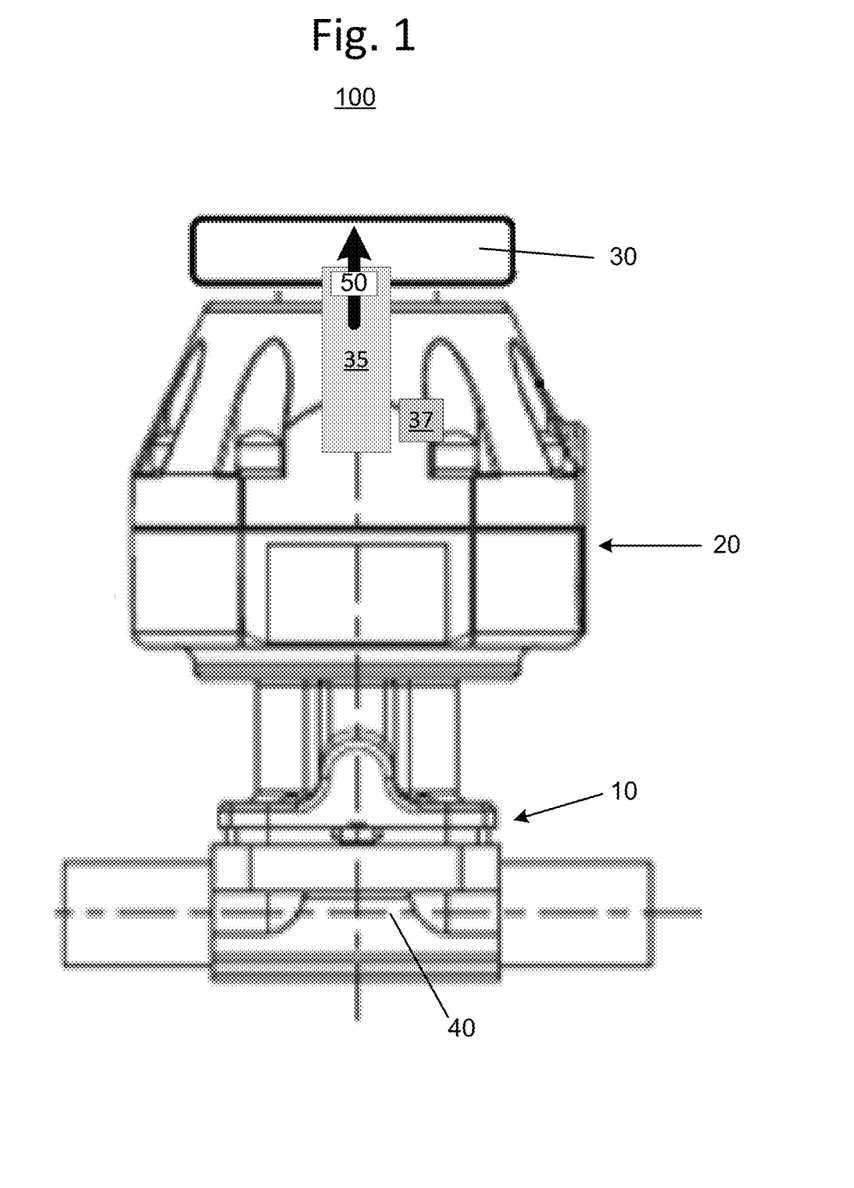
FIG. 1 is side view of a diaphragm valve, a diaphragm valve actuator, and a switch device.

FIG. 1 is side view of a diaphragm valve, a diaphragm valve actuator and a switch device, arranged in accordance with at least some embodiments described herein. System 100 may include a diaphragm valve 10, a diaphragm valve actuator 20, and a switch device 30. Diaphragm valve 10 may control flow of a fluid through a body 40 and diaphragm valve actuator 20 may control movement of a diaphragm of diaphragm valve 10. Diaphragm valve actuator 20 may be in physical communication with diaphragm valve 10. System 100 may further include a position sensor module 35 and a position sensor target 37. Position sensor module 35 may be stationary with regard to diaphragm valve actuator 20 and may be secured within diaphragm valve actuator 20, within switch device 30, or outside of diaphragm valve actuator 20. Position sensor target 37 may be affixed to a component of diaphragm valve actuator 20 that is configured to move in a first and second direction when diaphragm valve actuator 20 opens or closes diaphragm valve 10. Position sensor target 37 may move in the first and second direction within diaphragm valve actuator 20. Position sensor target 37 may be attached to an actuator plate, an actuator piston, a valve spindle or stem, or an indicator of diaphragm valve actuator 20. Position sensor module 35 may be configured to detected movement and a position of position sensor target 37. Position sensor module 35 may be a non-contact sensor such as a Hall effect sensor, an inductive sensor, a magnetic sensor, or a resistive sensor. Position sensor target 37 may be configured to be detected by position sensor module 35. Switch device 30 may be in communication with position sensor module 35. Switch device 30 may be in communication with actuator 20 to control a position of diaphragm valve 10. Position sensor module 35 may generate position data 50. Position data 50 may be data related to a position of position sensor target 37 as detected by position sensor module 35. Position sensor module 35 may transmit position data 50 to switch device 30. As explained in more detail below, switch device 30 may determine a position of diaphragm valve 10 based upon position data 50 and then control actuator 20 based on the determined position.

Figure 2:
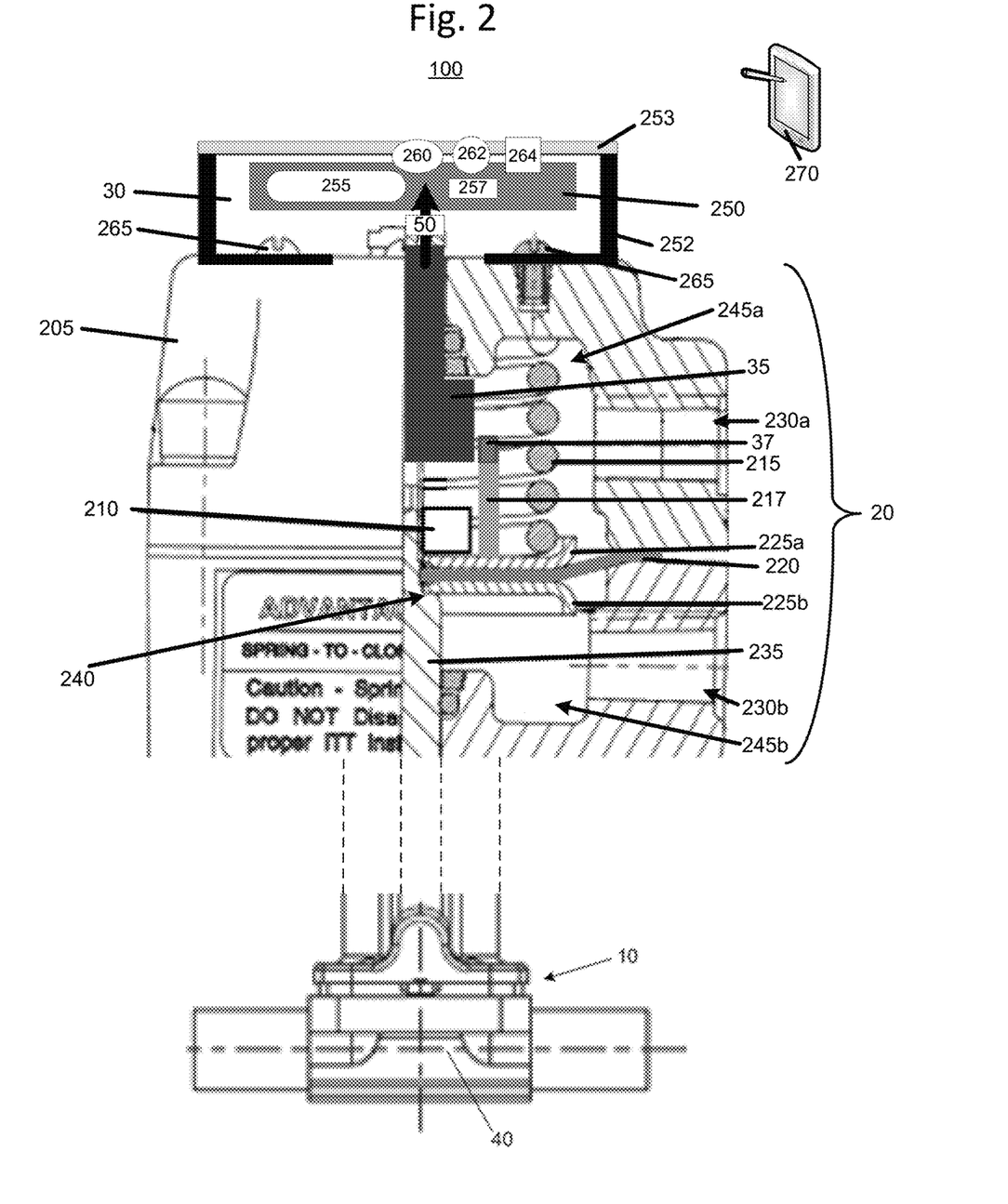
FIG. 2 is cutout side view of a diaphragm valve, a diaphragm valve actuator, and a switch device.

FIG. 2 is cutout side view of a diaphragm valve, a diaphragm valve actuator and a switch device, arranged in accordance with at least some embodiments described herein. Those components in FIG. 2 that are labeled identically to components of FIG. 1 will not be described again for the purposes of brevity.

In an embodiment, diaphragm valve actuator 20 may include an actuator cover 205, a nut 210, a spring 215, an actuator diaphragm 220, a diaphragm plate 225a, a diaphragm plate 225b, a port 230a, and a port 230b. Actuator diaphragm 220 may be between diaphragm plate 225a, and diaphragm plate 225b. An end of a valve spindle 235 may pass through center orifices of diaphragm plate 225a, actuator diaphragm 220, and diaphragm plate 225b such that diaphragm plate 225b is seated in a collar 240 of valve spindle 235. Nut 210 may secure diaphragm plate 225a, actuator diaphragm 220, and diaphragm plate 225b to valve spindle 235 by threading to male threads of an end of valve spindle 235. Spring 215 may be in contact with diaphragm plate 225a. Actuator diaphragm 220 may divide actuator 20 into a sealed upper chamber 245a and a sealed lower chamber 245b. Port 230a may allow for air to enter into upper chamber 245a and port 230b may allow for air to enter into lower chamber 245b. Air pressure in upper chamber 245a and lower chamber 245b may move a position of actuator diaphragm 220 and diaphragm plates 225a and 225b. Movement of actuator diaphragm 220 and diaphragm plates 225a and 225b may, in turn, move valve spindle 235 to open or close diaphragm valve 10.

Position sensor target 37 may be attached to diaphragm plate 225a with a target base 217 and located within spring 215. Position sensor target 37 may move with actuator diaphragm plate 225a and actuator diaphragm 220 as actuator 20 controls diaphragm valve 10 to open and close. When actuator 20 moves actuator diaphragm 220 to open diaphragm valve 10, position sensor target 37 may move in a first direction. When actuator 20 moves actuator diaphragm 220 to close diaphragm valve 10, position sensor target 37 may move in a second direction. Sensor module 35 may be proximate to position sensor target 37 and may be located within actuator 20. Position sensor module 35 may be configured to detect a position of position sensor target 37. Position sensor module 35 may be configured to detect motion of position sensor target 37. Position sensor module 35 may be a non-contact sensor such as a Hall effect sensor, an inductive sensor, a magnetic sensor, or a resistive sensor and position sensor target 37 may be configured to affect a response in position sensor module 35. Position sensor module 35 may generate position data 50 related to a position of position sensor target 37 as detected by position sensor module 35. Position sensor module 35 may transmit position data 50 to switch device 30.

Switch device 30 may be secured to an outer surface of actuator cover 205. Switch device 30 may include a housing 252, a cover 253, and a circuit board 250. Housing 252 and cover 253 may surround circuit board 250. Cover 253 may be removable to provide access to circuit board 250. Cover 253 may be transparent and enable visual access to circuit board 250. Housing 252 may be secured to actuator cover 205 by one or more fasteners 265. Circuit board 250 may be in communication with position sensor module 35. Circuit board 250 may be in wired communication with position sensor module 35. Circuit board 250 may be in wireless communication with position sensor module 35 such as by BLUETOOTH, WIFI, or any other wireless communication. Circuit board 250 may include a microcontroller 255 in communication with a terminal strip 257, an indicator module 260, a calibration module 262, and a connector 264. Connector 264 may be a connector to communicate data between an external device and microcontroller 255. Connector 264 may be a flexible wire connector such as an M12 connector.

Indicator module 260 may include light emitting diodes which may be visible through transparent cover 253 or may be attached externally through housing 252 or cover 253. Microcontroller 255 may control indicator module 260 to provide a visual indication of a position of diaphragm valve 10 (such as open or closed). For example, an illuminated green light emitting diode may indicate diaphragm valve 10 is open and an illuminated red light emitting diode may indicate that diaphragm valve 10 is closed.

Switch device 30 may be calibrated with calibration module 262. Calibration module 262 may allow microcontroller 255 of switch device 30 to correlate position data 50 with a position of diaphragm valve 10. For example, during a calibration operation, diaphragm valve 10 may be set to a fully open position. Position sensor module 35 may generate position data 50 related to a position of position sensor target 37 when diaphragm valve 10 is in a fully open position. Calibration module 262 may allow microcontroller 255 of switch device 30 to correlate position data 50 related to a position of position sensor target 37 when diaphragm valve 10 is in a fully open position. Diaphragm valve 10 may thereafter be set to a fully closed position. Position sensor module 35 may generate position data 50 related to a position of position sensor target 37 when diaphragm valve 10 is in a fully closed position. Calibration module 262 may allow microcontroller 255 of switch device 30 to correlate position data 50 related to a position of position sensor target 37 when diaphragm valve 10 is in a fully closed position with diaphragm valve 10 in a fully closed position. Calibration module may include calibration buttons which may be pressed when diaphragm valve 10 is in an open or closed position to calibrate position data 50 to a respective position of diaphragm valve 10. Calibration of microcontroller 255 and switch device 30 may also be performed remotely. A handheld device 270 may communicate with calibration module 262 and microcontroller 255 of switch device 30 wirelessly and may provide an indication that a position of diaphragm valve 10 is in an open or closed position to calibrate position data 50 to a respective position of diaphragm valve 10. Calibration module 262 may allow microcontroller 255 to calibrate fully open and closed positions of actuator 20 as actuator 20 is fully opened and closed.

Switch device 30 may receive position data 50 from position sensor module 35. Microcontroller 255 of switch device 30 may receive position data 50 and determine a position of diaphragm valve 10 based on position data 50. Microcontroller 255 of switch device 30 may control actuator 20 to position diaphragm valve 10 based on the determined position of diaphragm valve 10.

Figure 3:
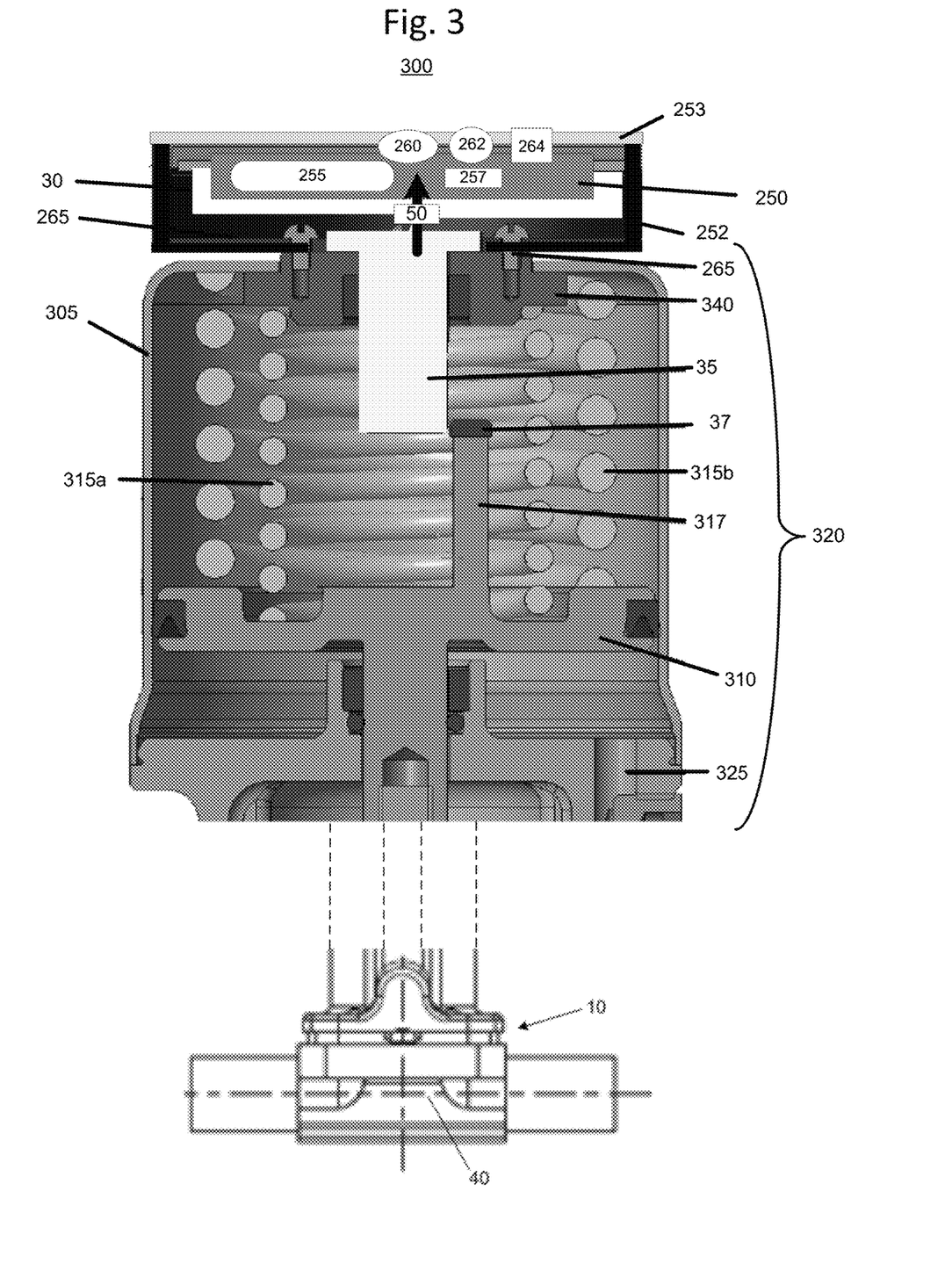
FIG. 3 is a cutout side view of a diaphragm valve, a piston actuator, and a switch device.

FIG. 3 is a cutout side view of a diaphragm valve, a piston actuator and a switch device, arranged in accordance with at least some embodiments described herein. Those components in FIG. 3 that are labeled identically to components of FIGS. 1-2 will not be described again for the purposes of brevity.

System 300 may include diaphragm valve 10, a piston actuator 320, and switch device 30. In an embodiment, a piston actuator 320 may include an actuator cover 305, spring 315a, spring 315b, piston 310, and a port 325.

Position sensor target 37 may be attached to a target base 317 and located within springs 315a and 315b. Position sensor target 37 may move with piston 310 as piston actuator 320 controls diaphragm valve 10 to open and close. When piston actuator 320 moves actuator piston 310 to open diaphragm valve 10, position sensor target 37 may move in a first direction. When piston actuator 320 moves piston 310 to close diaphragm valve 10, position sensor target 37 may move in a second direction. Position sensor module 35 may be attached to a top surface of actuator cover 305 or an accessory mount 340 of piston actuator 320. At least part of position sensor module 35 may be located within piston actuator 320 and position sensor module 35 may extend into piston actuator 320. Position sensor module 35 may be a stationary reference relative to piston 310. Position sensor module 35 may be configured to detect a position of position sensor target 37. Position sensor module 35 may be configured to detect motion of position sensor target 37. Position sensor module 35 may be a non-contact sensor such as a Hall effect sensor, an inductive sensor, a magnetic sensor, or a resistive sensor and position sensor target 37 may be configured to affect a response in position sensor module 35. Position sensor module 35 may generate position data 50 related to a position of position sensor target 37 as detected by position sensor module 35. Position sensor module 35 may transmit position data 50 to switch device 30.

Switch device 30 may be secured to an outer surface of actuator cover 305 with one or more fasteners 265. Switch device 30 may include a housing 252, a cover 253, and a circuit board 250. Housing 252 and cover 253 may surround circuit board 250. Cover 253 may be removable to provide access to circuit board 250. Cover 253 may be transparent and enable visual access to circuit board 250. Housing 252 may be secured to actuator cover 305 by one or more fasteners 265. Circuit board 250 may be in communication with position sensor module 35. Circuit board 250 may be in wired communication with position sensor module 35. Circuit board 250 may be in wireless communication with position sensor module 35 such as by BLUETOOTH, WIFI, or any other wireless communication. Circuit board 250 may include a microcontroller 255 in communication with a terminal strip 257, an indicator module 260, a calibration module 262, and a connector 264. Connector 264 may be a connector to communicate data between an external device and microcontroller 255. Connector 264 may be a flexible wire connector such as an M12 connector.

Indicator module 260 may include light emitting diodes which may be visible through transparent cover 253 or may be attached externally through housing 252 or cover 253. Microcontroller 255 may control indicator module 260 to provide a visual indication of a position of diaphragm valve 10 (such as open or closed). For example, an illuminated green light emitting diode may indicate diaphragm valve 10 is open and an illuminated red light emitting diode may indicate that diaphragm valve 10 is closed.

Switch device 30 may be calibrated with calibration module 262. Calibration module 262 may allow microcontroller 255 of switch device 30 to correlate position data 50 with a position of diaphragm valve 10. For example, during a calibration operation, diaphragm valve 10 may be set to a fully open position. Position sensor module 35 may generate position data 50 related to a position of position sensor target 37 when diaphragm valve 10 is in a fully open position. Calibration module 262 may allow microcontroller 255 of switch device 30 to correlate position data 50 related to a position of position sensor target 37 when diaphragm valve 10 is in a fully open position. Diaphragm valve 10 may thereafter be set to a fully closed position. Position sensor module 35 may generate position data 50 related to a position of position sensor target 37 when diaphragm valve 10 is in a fully closed position. Calibration module 262 may allow microcontroller 255 of switch device 30 to correlate position data 50 related to a position of position sensor target 37 when diaphragm valve 10 is in a fully closed position with diaphragm valve 10 in a fully closed position. Calibration module may include calibration buttons which may be pressed when diaphragm valve 10 is in an open or closed position to calibrate position data 50 to a respective position of diaphragm valve 10. Calibration of microcontroller 255 and switch device 30 may also be performed remotely. A handheld device 270 may communicate with calibration module 262 and microcontroller 255 of switch device 30 wirelessly and may provide an indication that a position of diaphragm valve 10 is in an open or closed position to calibrate position data 50 to a respective position of diaphragm valve 10. Calibration module 262 may allow microcontroller 255 to calibrate fully open and closed positions of actuator 20 as actuator 20 is fully opened and closed.

Figure 4:
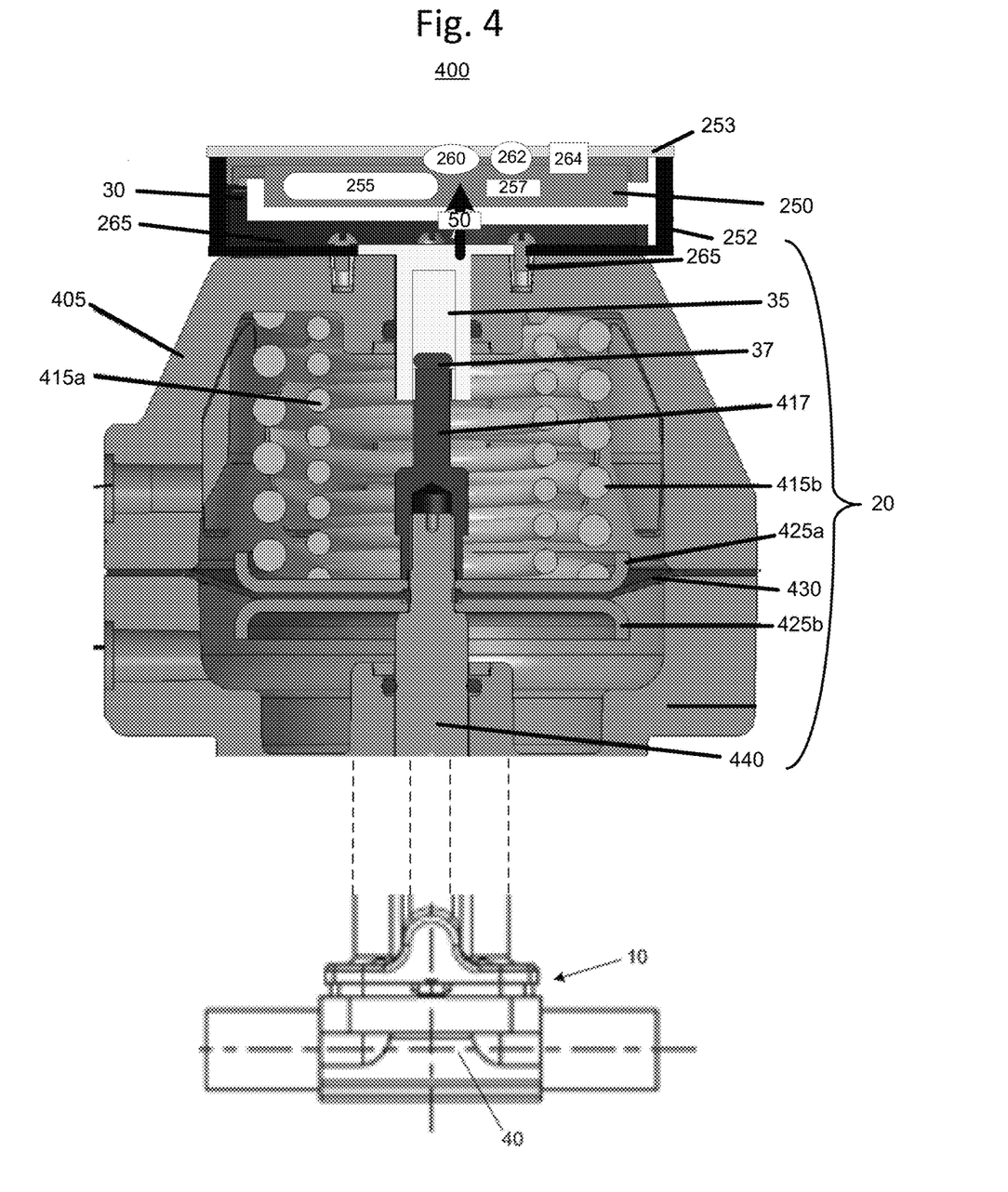
FIG. 4 is a cutout side view of a diaphragm valve, a diaphragm valve actuator, and a switch device.

FIG. 4 is a cutout side view of a diaphragm valve, a diaphragm valve actuator, and a switch device, arranged in accordance with at least some embodiments described herein. Those components in FIG. 4 that are labeled identically to components of FIGS. 1-3 will not be described again for the purposes of brevity.

System 400 may include diaphragm valve 10, actuator 20, and switch device 30. In another embodiment, position sensor target 37 may be attached to a target base 417 and located within springs 415a and 415b. Position sensor target 37 may move with a valve spindle 440 as actuator 20 controls diaphragm valve 10 to open and close. When actuator 20 moves diaphragm plate 425a, diaphragm 430, and diaphragm plate 425b to open diaphragm valve 10, position sensor target 37 may move in a first direction. When actuator 20 moves diaphragm plate 425a, diaphragm 430, and diaphragm plate 425b to close diaphragm valve 10, position sensor target 37 may move in a second direction. Position sensor module 35 may be attached to a top surface of actuator cover 405 actuator 20. At least part of position sensor module 35 may be located within actuator 20 and position sensor module 35 may extend into diaphragm actuator 20. Position sensor module 35 may be a stationary reference relative to valve spindle 440. Position sensor module 35 may include a hollow section configured to receive position sensor target 37. Position sensor module 35 may be configured to detect a position of position sensor target 37. Position sensor module 35 may be configured to detect motion of position sensor target 37. Position sensor module 35 may generate position data 50 related to a position of position sensor target 37 as detected by position sensor module 35. Position sensor module 35 may transmit position data 50 to switch device 30.

Figure 5:
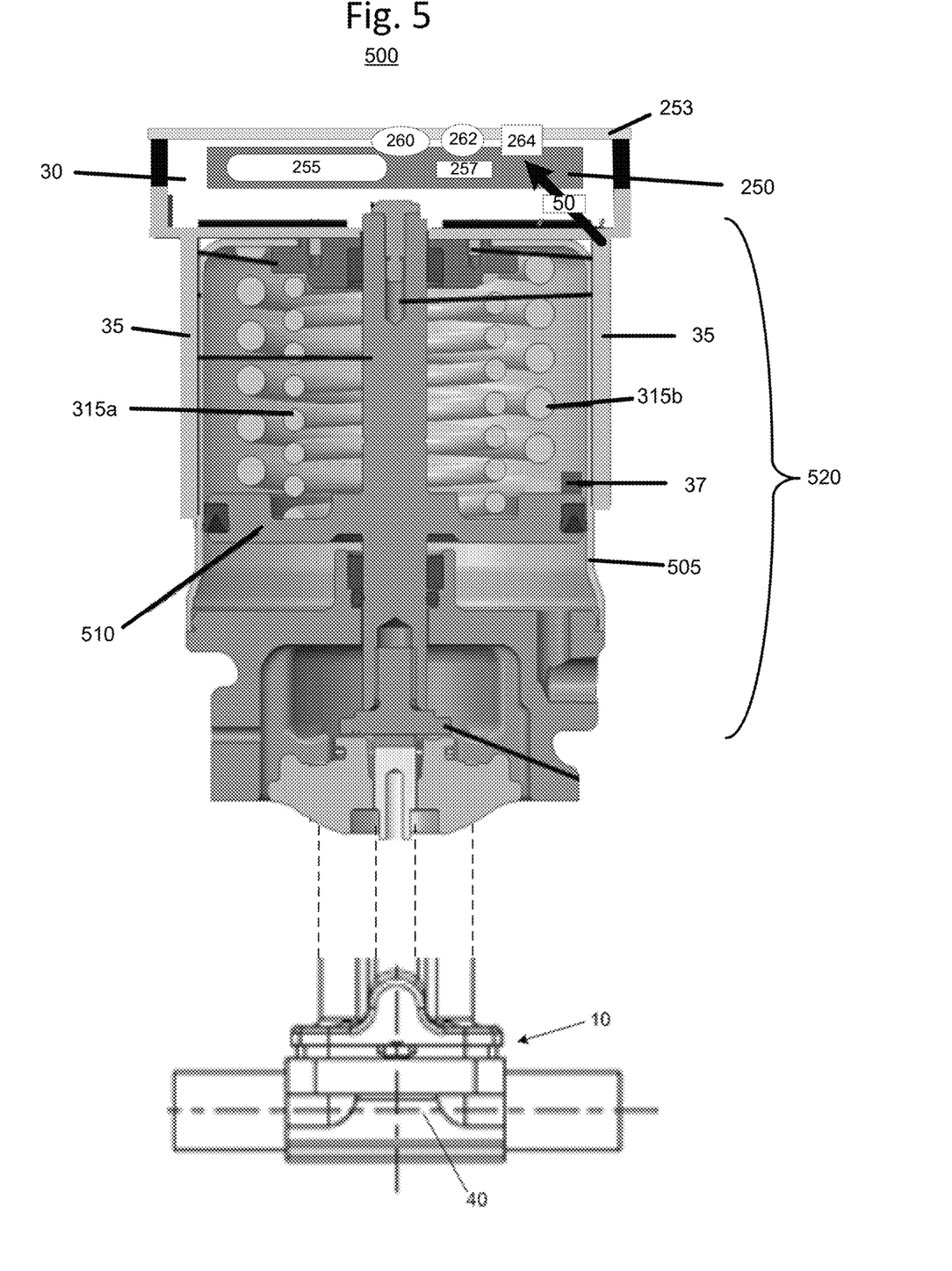
FIG. 5 is a cutout side view of a diaphragm valve, a piston actuator, and a switch device.

FIG. 5 is a cutout side view of a diaphragm valve, a piston actuator, and a switch device, arranged in accordance with at least some embodiments described herein. Those components in FIG. 5 that are labeled identically to components of FIGS. 1-4 will not be described again for the purposes of brevity.

System 500 may include diaphragm valve 10, a piston actuator 520, and switch device 30. In another embodiment, position sensor target 37 may be attached to a piston 510. Position sensor target 37 may be attached to piston 510 so that position sensor target is adjacent to an interior surface of actuator cover 505. Position sensor target 37 may move with piston 510 as piston actuator 520 controls diaphragm valve 10 to open and close. When piston actuator 520 moves piston 510 to open diaphragm valve 10, position sensor target 37 may move in a first direction. When piston actuator 520 moves piston 510 to close diaphragm valve 10, position sensor target 37 may move in a second direction. Position sensor module 35 may be attached to an exterior surface of actuator cover 505 and may be a stationary reference relative to piston 510. Position sensor module 35 may be configured to detect a position of position sensor target 37 through actuator cover 505. Position sensor module 35 may be configured to detect motion of position sensor target 37 through actuator cover 505. Position sensor module 35 may generate position data 50 related to a position of position sensor target 37 as detected by position sensor module 35. Position sensor module 35 may transmit position data 50 to switch device 30.

Figure 6:
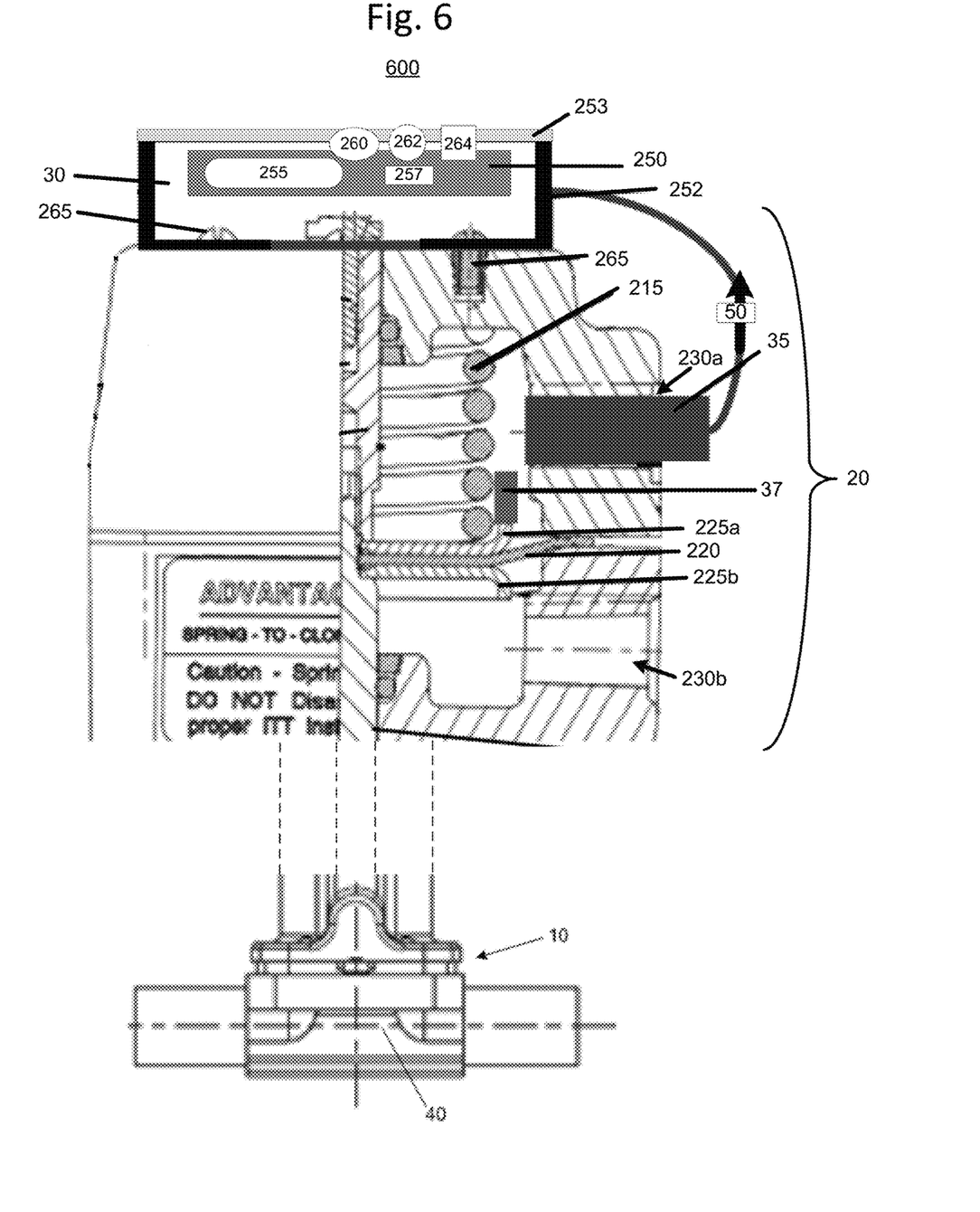
FIG. 6 is a cutout side view of a diaphragm valve, a diaphragm valve actuator, and a switch device.

FIG. 6 is a cutout side view of a diaphragm valve, a diaphragm valve actuator, and a switch device, arranged in accordance with at least some embodiments described herein. Those components in FIG. 6 that are labeled identically to components of FIGS. 1-5 will not be described again for the purposes of brevity.

System 600 may include diaphragm valve 10, actuator 20, and switch device 30. In another embodiment, position sensor target 37 may be attached to an outer edge of diaphragm plate 225a and may be located outside of spring 215. Position sensor target 37 may move with actuator diaphragm plate 225a and actuator diaphragm 220 as actuator 20 controls diaphragm valve 10 to open and close. When actuator 20 moves actuator diaphragm 220 to open diaphragm valve 10, position sensor target 37 may move in a first direction. When actuator 20 moves actuator diaphragm 220 to close diaphragm valve 10, position sensor target 37 may move in a second direction. Position sensor module 35 may be attached to or inserted within air port 230a and may be a stationary reference relative to actuator diaphragm plate 225a and actuator diaphragm 220 as actuator 20 controls diaphragm valve 10 to open and close. Position sensor module 35 may be configured to detect a position of position sensor target 37. Position sensor module 35 may be configured to detect motion of position sensor target 37. Position sensor module 35 may generate position data 50 related to a position of position sensor target 37 as detected by position sensor module 35. Position sensor module 35 may transmit position data 50 to switch device 30.

Figure 7:
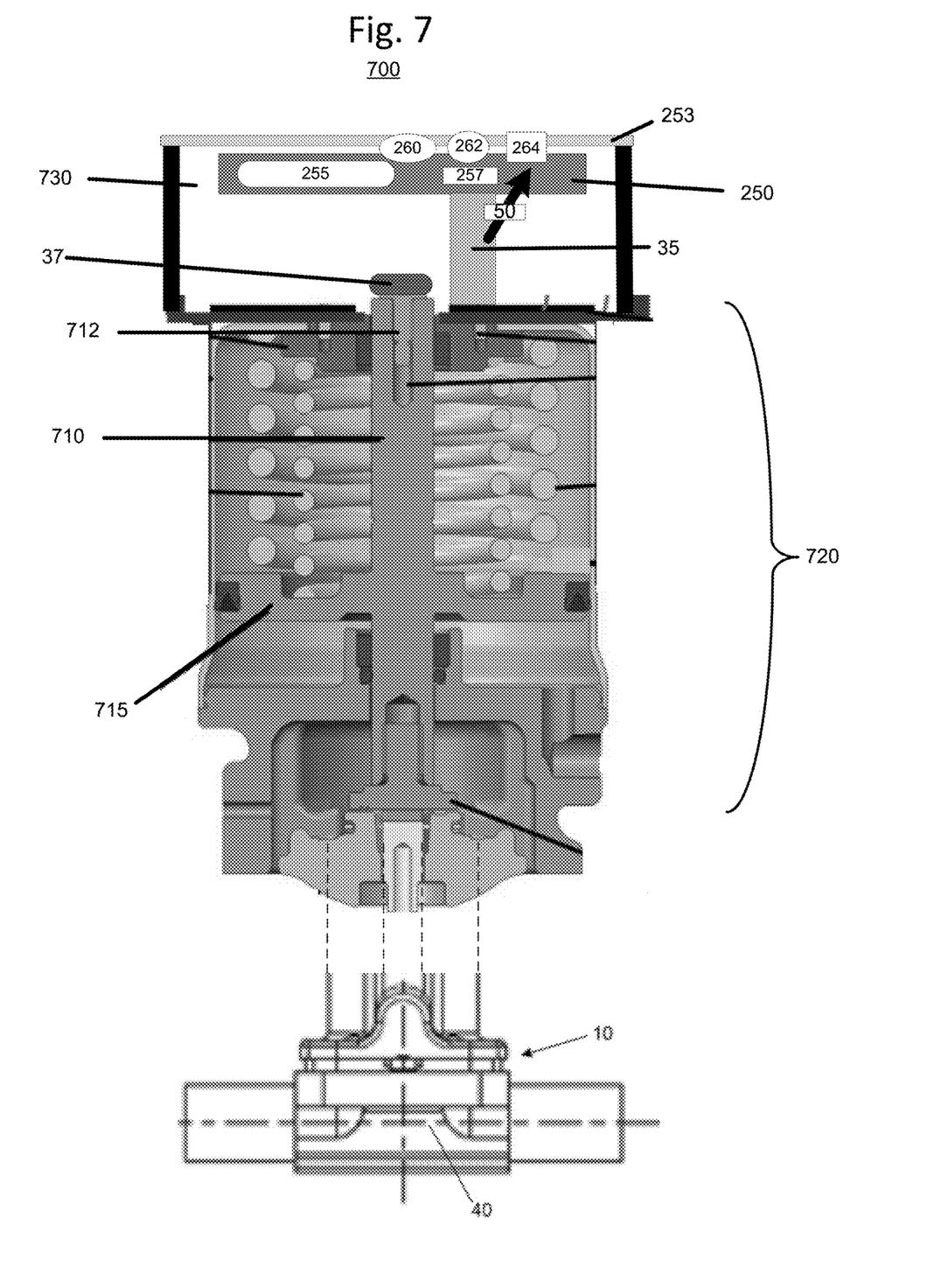
FIG. 7 is a cutout side view of a diaphragm valve, a piston actuator, and a switch device.

FIG. 7 is a cutout side view of a diaphragm valve, a piston actuator, and a switch device, arranged in accordance with at least some embodiments described herein. Those components in FIG. 7 that are labeled identically to components of FIGS. 1-6 will not be described again for the purposes of brevity.

System 700 may include diaphragm valve 10, a piston actuator 720, and switch device 730. In another embodiment, position sensor target 37 may be attached to an indicator 712 attached to an indicator spindle 710. Indicator spindle 710 may be attached to piston 715 and may move with piston 715. Position sensor target 37 may move with indicator spindle 710 and piston 715 as piston actuator 720 controls diaphragm valve 10 to open and close. When piston actuator 720 moves piston 715 to open diaphragm valve 10, position sensor target 37 may move in a first direction. When piston actuator 720 moves piston 715 to close diaphragm valve 10, position sensor target 37 may move in a second direction. Position sensor module 35 may be within switch device 730 and may be attached circuit board 250 or a surface of switch device 250. Position sensor module 35 may be a stationary reference relative to indicator spindle 710 and piston 715. Position sensor module 35 may be configured to detect a position of position sensor target 37. Position sensor module 35 may be configured to detect motion of position sensor target 37. Position sensor module 35 may generate position data 50 related to a position of position sensor target 37 as detected by position sensor module 35. Position sensor module 35 may transmit position data 50 circuit board 250 of switch device 30.

Figure 8:
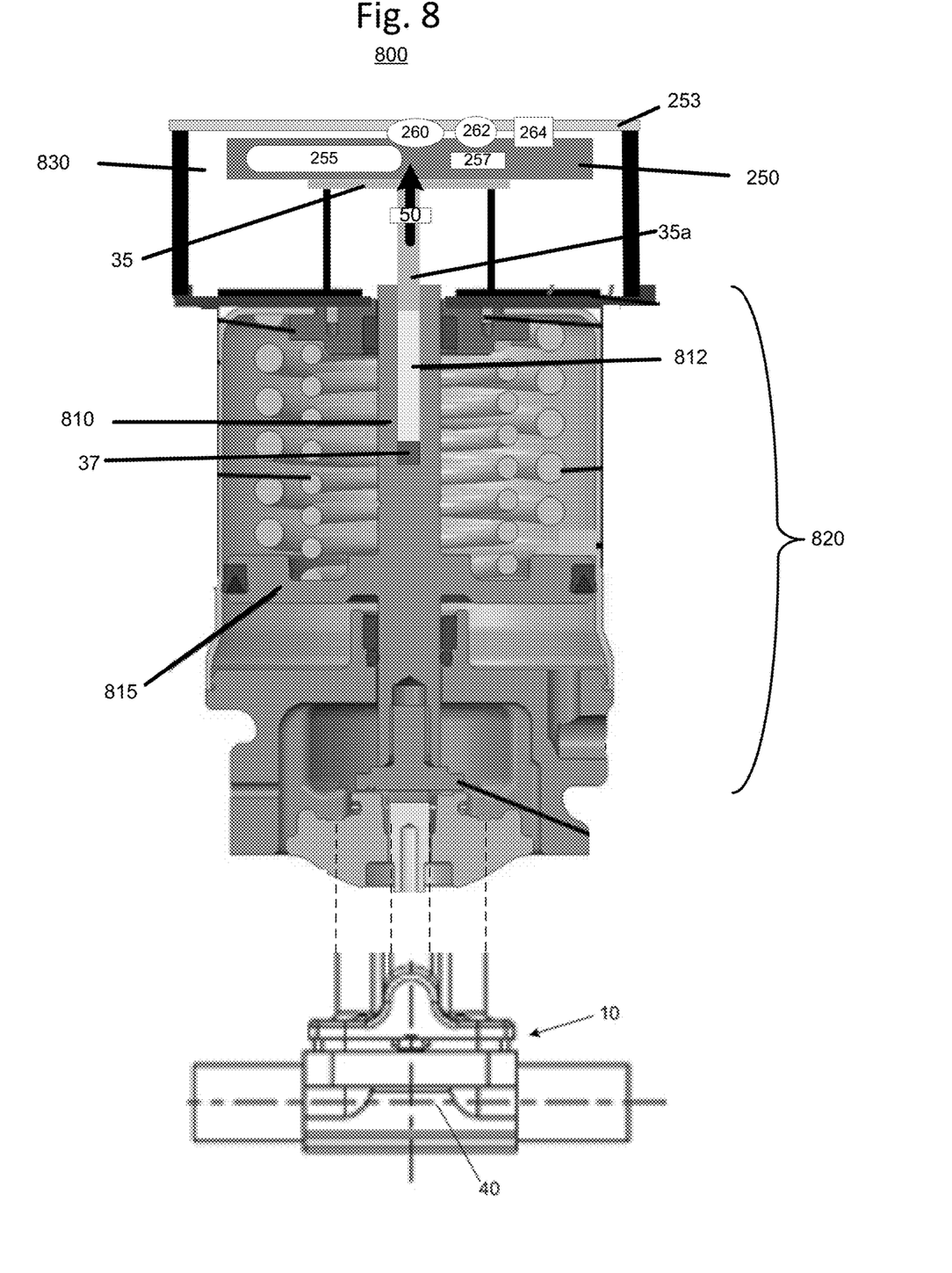
FIG. 8 is a cutout side view of diaphragm valve, a piston actuator, and a switch device.

FIG. 8 is a cutout side view of diaphragm valve, a piston actuator, and a switch device, arranged in accordance with at least some embodiments described herein. Those components in FIG. 8 that are labeled identically to components of FIGS. 1-7 will not be described again for the purposes of brevity.

System 800 may include diaphragm valve 10, a piston actuator 820, and switch device 830. In another embodiment, position sensor target 37 may be attached to an indicator spindle 810 within an indicator channel 812 defined by indicator spindle 810. Indicator spindle 810 may be attached to piston 815 and may move with piston 815. Position sensor target 37 may move with indicator spindle 810 and piston 815 as piston actuator 820 controls diaphragm valve 10 to open and close. When piston actuator 820 moves piston 815 to open diaphragm valve 10, position sensor target 37 may move in a first direction. When piston actuator 820 moves piston 815 to close diaphragm valve 10, position sensor target 37 may move in a second direction. Position sensor module 35 may be within switch device 830 and may be attached circuit board 250 or a surface of switch device 830. Position sensor module 35 may include a protrusion 35a which may be configured such that indicator channel 812 may fit around protrusion 35a. Position sensor module 35 and protrusion 35a may be a stationary reference relative to indicator spindle 810, indicator channel 812, and piston 815. Indicator channel 812 and indicator spindle 810 may move up and down around protrusion 35a when actuator 820 moves piston 815 to open and close diaphragm valve 10. Position sensor module 35 may be configured to detect a position of position sensor target 37. Position sensor module 35 may be configured to detect motion of position sensor target 37. Position sensor module 35 may generate position data 50 related to a position of position sensor target 37 as detected by position sensor module 35. Position sensor module 35 may transmit position data 50 circuit board 250 of switch device 830.

A device in accordance with the present disclosure may allow for a smaller switching device to minimize a volume of a piping system. A device in accordance with the present disclosure may provide a switching device with a feedback unit integral to an actuator. A device in accordance with the present disclosure may provide a switching device which may be easier to calibrate than a conventional switching device. A device in accordance with the present disclosure may provide a switching device which visually indicates a position of a diaphragm valve. A device in accordance with the present disclosure may provide a switching device significantly smaller than a conventional switching device.

Figure 9:
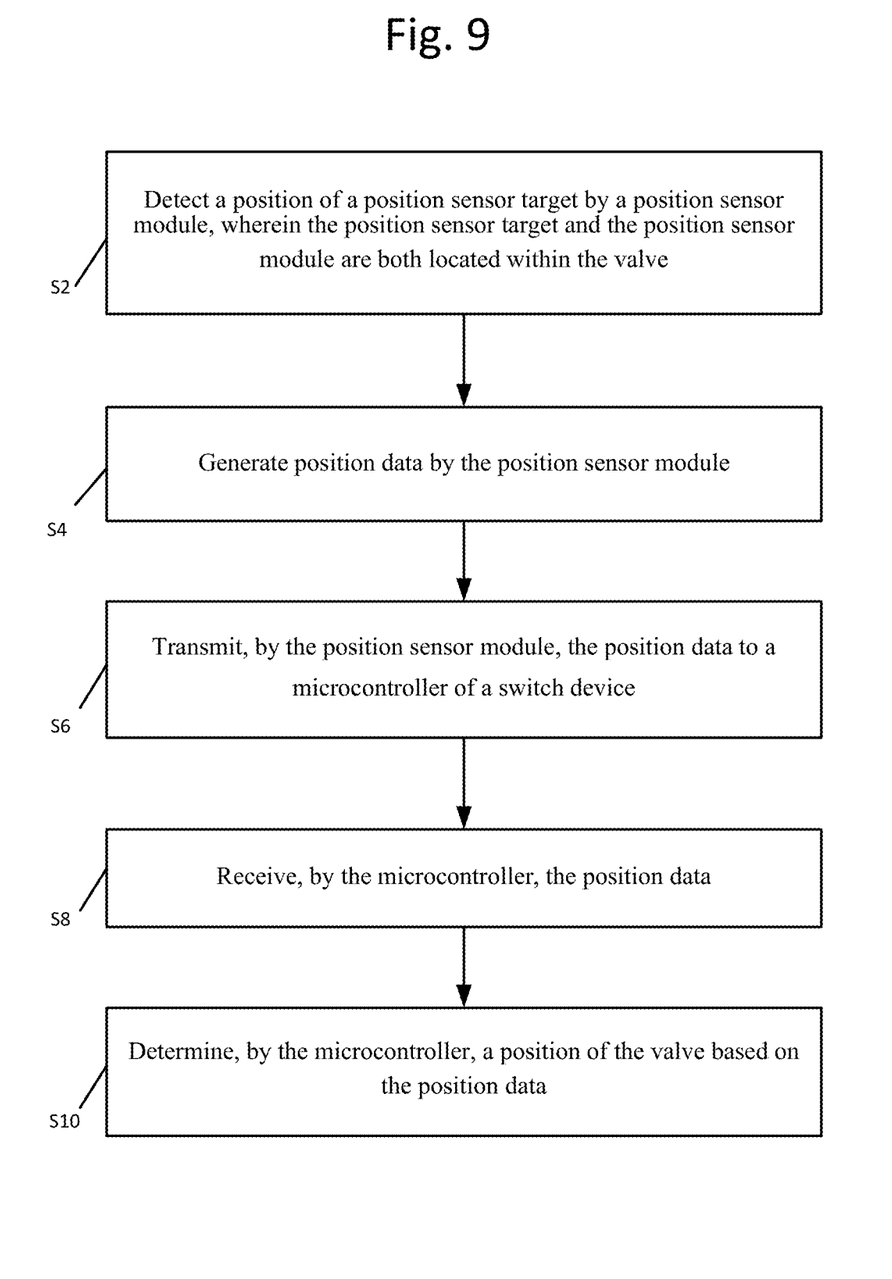
FIG. 9 illustrates a flow diagram for an example process to control a position of a diaphragm valve, all arranged according to at least some embodiments described herein.

FIG. 9 illustrates a flow diagram for an example process to control a position of a diaphragm valve, arranged in accordance with at least some embodiments presented herein. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Detect a position of a position sensor target by a position sensor module, wherein the position sensor target and the position sensor module are both located within the valve". At block S2, a position sensor module may detect a position of a position sensor target. The position sensor module may be a non-contact sensor such as a Hall effect sensor, an inductive sensor, a magnetic sensor, or a resistive sensor. The position sensor target may be configured to be detected by the position sensor module. The position sensor module and the position sensor target may both be located within the valve. The valve may comprise a diaphragm valve, an actuator, and a switching device.

Processing may continue from block S2 to block S4, "Generate position data by the position sensor module". At block S4, the position sensor module may generate position data. The position data may be data related to a position of the position sensor target as detected by the position sensor module.

Processing may continue from block S4 to block S6, "Transmit, by the position sensor module, the position data to a microcontroller of a switch device". At block S6, the position sensor module may transmit the position data to a microcontroller of a switch device.

Processing may continue from block S6 to block S8, "Receive, by the microcontroller, the position data". At block S8, the microcontroller may receive the position data.

Processing may continue from block S8 to block S10, "Determine, by the microcontroller, a position of the valve based on the position data". At block S10, the microcontroller may determine a position of the valve based on the position data. The microcontroller may be calibrated. The microcontroller may be calibrated with position data correlated to the valve in a fully opened position and the microcontroller may be calibrated with position data correlated to the valve in a fully closed position.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine a position of a diaphragm valve, the method comprising:
    detecting a position of a position sensor target by a position sensor module, wherein the position sensor module is located along a central axis of an actuator of the diaphragm valve and includes a resistive sensor, the position sensor target is located within the diaphragm valve, and the position sensor target is attached to at least one part of an actuator that moves, is in physical communication with the diaphragm valve, and the position sensor target is offset from the central axis of the actuator;
    generating position data by the position sensor module;
    transmitting, by the position sensor module, the position data to a microcontroller of a switch device;
    receiving, by the microcontroller, the position data; and
    determining, by the microcontroller, a position of the diaphragm valve based on the position data.

2. A switch device to determine a position of a valve, the device comprising:
    a housing attached to an actuator, wherein the actuator is in physical communication with the valve;
    a microcontroller within the housing, wherein the microcontroller is in communication with the actuator to control a position of the valve;
    a position sensor module, wherein the position sensor module is located along a central axis of the actuator and is in communication with the microcontroller; and
    a position sensor target attached to at least one part of the actuator that moves, wherein the position sensor target is offset from the central axis of the actuator, wherein:
        the position sensor module is configured to detect movement and a position of the position sensor target, generate position data related to the position of the position sensor target, and transmit the position data to the microcontroller, and
        the microcontroller is configured to determine a position of the valve based on the position data.

3. The device of claim 2, wherein the position sensor module is a non-contact sensor including a Hall effect sensor, an inductive sensor, a magnetic sensor, or a resistive sensor.

4. The device of claim 2, wherein the actuator is a diaphragm valve actuator, and the position sensor target is attached to a diaphragm plate and located within springs of the diaphragm valve actuator.

5. The device of claim 2, further comprising a calibration module in communication with the microcontroller, wherein the calibration module is configured to calibrate a position of the valve with position data.

6. The device of claim 2, further comprising an indicator module in communication with the microcontroller, wherein the indicator module is configured to visually indicate a position of the valve by illumination of a green light emitting diode when the valve is open or illumination of a red light emitting diode when the valve is closed.

7. A system to determine a position of a valve, the system comprising:
- an actuator, wherein the actuator is in physical communication with the valve and the actuator is configured to move in a first direction to close the valve and to move in a second direction to open the valve; and
- a switch device including:
  - a housing attached to the actuator;
  - a microcontroller within the housing, the microcontroller in communication with the actuator to control a position of the valve;
  - a position sensor module, the position sensor module is located along a central axis of the actuator and in communication with the microcontroller; and
  - a position sensor target attached to at least one part of the actuator that moves, the position sensor target is offset from the central axis of the actuator, wherein:
    the position sensor module is configured to detected movement and a position of the position sensor target, generate position data related to the position of the position sensor target, and transmit the position data to the microcontroller, and
    the microcontroller is configured to determine a position of the valve based on the position data.

8. The system of claim 7, wherein the position sensor module is a non-contact sensor including a Hall effect sensor, an inductive sensor, a magnetic sensor, or a resistive sensor.

9. The system of claim 7, wherein the actuator is a diaphragm valve actuator, and the position sensor target is attached to a diaphragm plate and located within springs of the diaphragm valve actuator.

10. The system of claim 7, wherein the switch device further includes:
- a calibration module in communication with the microcontroller, the calibration module configured to calibrate a position of the valve with position data; and
- an indicator module in communication with the microcontroller, the indicator module configured to visually indicate a position of the valve by illumination of a green light emitting diode when the valve is open or illumination of a red light emitting diode when the valve is closed.

* * * * *